Figure 1:
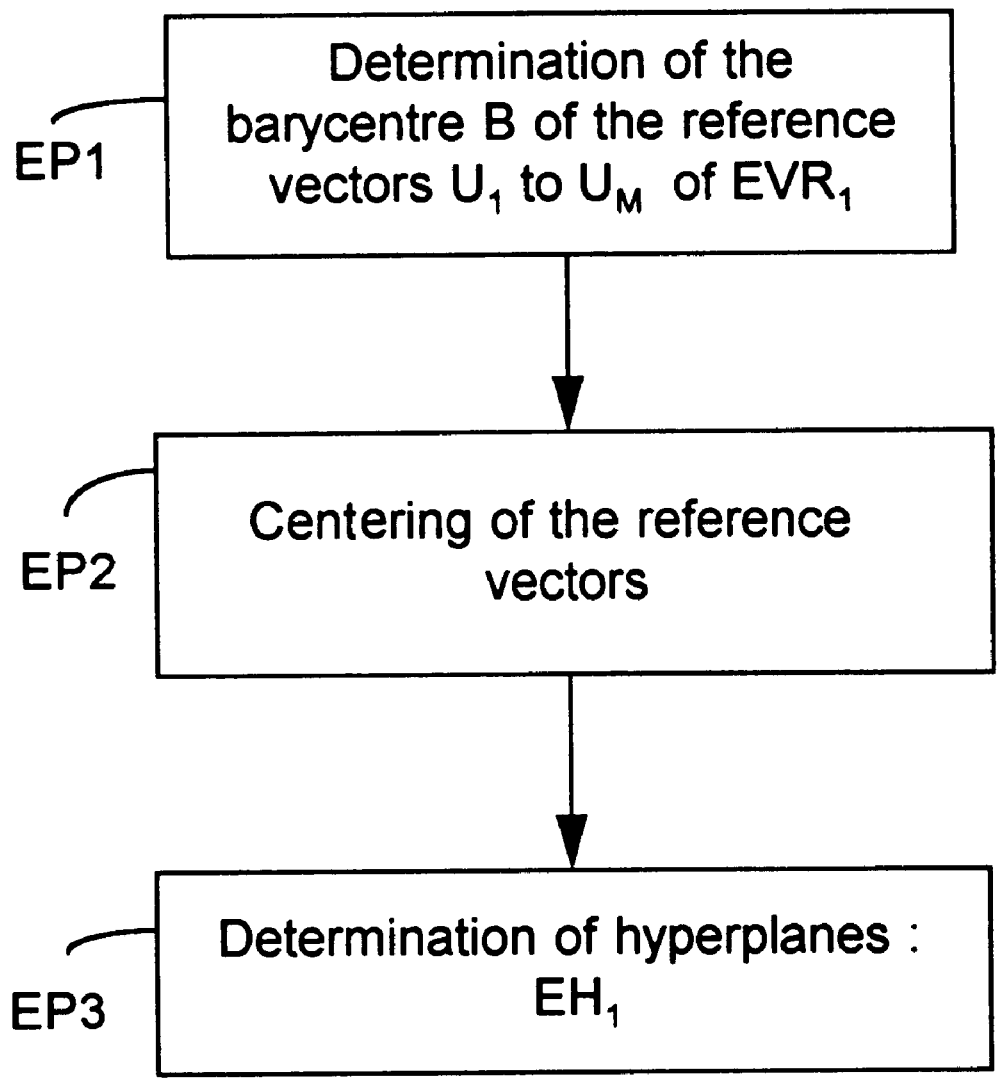

United States Patent [19]
Henry

[11] Patent Number: 5,911,011
[45] Date of Patent: Jun. 8, 1999

[54] MULTIDIMENSIONAL CLOSE NEIGHBOR SEARCH

[75] Inventor: Félix Henry, Rennes, France

[73] Assignee: Canon Kabushiki Kaisha, Tokyo, Japan

[21] Appl. No.: 08/991,775

[22] Filed: Dec. 16, 1997

[30] Foreign Application Priority Data

Feb. 28, 1997 [FR] France .................................. 97 02433

[51] Int. Cl.$^6$ .................................................. G06F 17/30
[52] U.S. Cl. ............................ 382/253; 707/5; 382/240; 382/232
[58] Field of Search ........................... 707/3–6; 348/414, 348/422, 253; 704/222; 382/232, 240, 253

[56] References Cited

U.S. PATENT DOCUMENTS

| | | | |
|---|---|---|---|
| 5,414,527 | 5/1995 | Koshi et al. | 358/433 |
| 5,468,069 | 11/1995 | Prasanna | 382/253 |
| 5,553,163 | 9/1996 | Nivelle | 382/227 |

OTHER PUBLICATIONS

Ramasubramanian, et al. "Fast K–Dimensional Tree Algorithms for Nearest Neighbor Search with Application to Vector Quantization Encoding", 8084 IEEE Transaction on Signal Processing 40(1992) Mar. No. 3, New York, US.

Cheng, et al. "A Fast Codebook Search Algorithm for Nearest–Neighbor Pattern Matching", 1986 IEEE, pp. 265–268.

Madisetti, et al. "A Radius–Bucketing Approach to Fast Vector Quantization Encoding", 1989 IEEE, pp. 1767–1770.

M. Kamel et al., "Fast Nearest Neighbor Search for Vector Quantization of Image Data," 1192 11th Int'l Conference on Pattern Recognition, vol. III: Conference C, IEEE, pp. 623–626, 1992.

*Primary Examiner*—Paul V. Kulik
*Attorney, Agent, or Firm*—Fitzpatrick, Cella, Harper & Scinto

[57] ABSTRACT

A method for a multidimensional search for a close neighbor of an input vector, amongst a first set of reference vectors, comprises the prior determination of a first set of hyperplanes in the space containing the reference vectors, then selection of a first hyperplane from the first set, formation of a second set of reference vectors, by eliminating reference vectors which are on the other side of the first hyperplane selected, compared with the input vector, formation of a second set of hyperplanes, by eliminating the said first hyperplane, reiteration, a predetermined number of times, of the selection and formation operations, taking, as the first set of reference vectors and as the first set of hyperplanes, respectively, the second sets formed previously, and searching for the closest neighbor of the input vector in the second set of reference vectors.

18 Claims, 8 Drawing Sheets

MULTIDIMENSIONAL CLOSE NEIGHBOR SEARCH

The present invention concerns the multidimensional search for a close neighbor of an input vector, amongst a predetermined set of reference vectors. The present invention also concerns the coding by global or local vectorial quantification of digital signals, and the production of a dictionary of reference vectors.

The invention applies notably to the compression of digital signals, such as digital images. In this context, the present invention is usable for example in a digital camera.

Hereinafter, vector designates a set of N coordinates, where N is an integer and each coordinate is a real number. By way of example, a vector may be a block of adjacent pixels in a digital image, each coordinate of the vector being equal to the value of a respective one of the pixels.

A reference vector will be a close neighbor of the input vector if the distance from the input vector to the reference vector under consideration is small compared with the mean of the distances from the input vector to each of the reference vectors.

The notion of distance is taken in the mathematical sense of the term; for example, the distance between two vectors may be the mean quadratic error calculated on the coordinates of the two vectors, or the largest of the absolute values of the differences of their coordinates taken in pairs.

Moreover, it should be noted that in an affine space of dimension N, where N is an integer, a hyperplane is a sub-space of dimension N−1, defined by a point and N−1 independent vectors.

The search for a close neighbor of an input vector amongst a predetermined set of reference vectors is notably used to classify a set of objects defined by a certain number of their characteristics, such as for example their size, color and weight. Each of these characteristics is quantified and forms a coordinate in a multidimensional space.

"Typical" objects are predetermined and each represents a class. The coordinates of the typical objects form the reference vectors. A given object, known by its coordinates, is classified by attribution of the class of the typical object to which it is closest.

Another application of the search for a close neighbor of an input vector amongst a predetermined set of reference vectors is vectorial quantification. Each reference vector is associated with an index.

An input vector is compared with all the reference vectors, or code vectors, of a predetermined dictionary in order to determine which reference vector is closest to the input vector. The input vector is replaced by the index associated with the closest reference vector. The index constitutes a compressed form of the input vector, capable of being stored or transmitted to a receiver.

A first close neighbor search method category comprises the exhaustive search methods. These methods consist of calculating the distance between the input vector and each reference vector, and selecting the reference vector for which the calculated distance is the smallest.

These methods make it possible to determine the reference vector closest to the input vector. However, in order to obtain good coding precision, it is necessary to have a large number of reference vectors. The distance calculations are then numerous, and consequently the calculation time for coding a vector is very long.

A second close neighbor search method category comprises the rapid search methods. These so-called BHT (Binary Hyperplane Testing) methods are based on a Voronoï partition of the space: each reference vector has associated with it a Voronoï cell, which is the set of vectors for which the reference vector under consideration is the closest neighbor amongst all the reference vectors. An input vector will have a reference vector as its closest neighbor if it is situated in the Voronoï cell associated with this reference vector.

To this end, a preliminary phase comprises determination of a set of hyperplanes in order to separate the reference vectors into sub-sets.

After this preliminary phase, an input vector is coded by determining on which side it is situated in relation to a hyperplane, and eliminating the reference vectors which are situated on the other side of this hyperplane. This step is repeated for a certain number of hyperplanes, then a search is made amongst the remaining Voronoï cells for the Voronoï cell in which the input vector is situated. The reference vector associated with this Voronoï cell is then the closest neighbor of the input vector.

However, in order to eliminate a reference vector, it is necessary to know whether the Voronoï cell associated with it is entirely on one side or the other of the hyperplane under consideration, without being crossed by it. This is because it is possible that the input vector is situated in a Voronoï cell crossed by the hyperplane under consideration and that the reference vector associated with this Voronoï cell is not on the same side of the hyperplane as the input vector. These cells must therefore not be eliminated, if it is wished to obtain good search precision.

At the preliminary phase, it is therefore necessary to determine reliably whether or not a Voronoï cell is crossed by a hyperplane. This involves a significant calculation time at the preliminary phase.

The present invention aims to remedy the drawbacks of the prior art, by providing a multidimensional close neighbor search method which is much faster than the prior art.

To this end, the invention proposes a method for a multidimensional search for a close neighbor of an input vector representing physical data, amongst a first set of reference vectors stored in a memory means, characterised in that it has a prior step of determining, according to first rules, a first set of hyperplanes in the space containing the reference vectors, then the steps of:
  selecting, according to second rules, a first hyperplane from the first set of hyperplanes,
  forming a second set of reference vectors from the first set of reference vectors, by eliminating the reference vectors which are on the other side of the first hyperplane selected, compared with the input vector,
  forming a second set of hyperplanes, by eliminating the said first hyperplane from the first set of hyperplanes,
  reiterating, a predetermined number of times, the selection step and the two formation steps, taking, as the first set of reference vectors and the first set of hyperplanes, respectively, the second set of reference vectors and the second set of hyperplanes formed previously,
  searching, according to third rules, for the closest neighbor of the input vector in the second set of reference vectors.

The prior step of the method according to the invention does not require long and complex calculations; on the contrary, its execution is rapid.

The other steps do not necessarily lead to the detection of the closest neighbor, but to the detection of a close neighbor. This slight loss of precision allows a significant gain in speed.

The number of reiterations makes it possible to adjust the speed/precision compromise.

According to preferred characteristics of the invention, the method includes the prior steps of determining the barycentre of the reference vectors and calculating coordinates of the reference vectors and the input vector in a reference frame centered on the barycentre.

These steps, which involve simple calculations, lead to centering of the reference vectors around their barycentre, that is to say a population of reference vectors distributed around a central reference frame is then considered. This change of reference frame simplifies the subsequent calculations.

According to another preferred characteristic of the invention, the first rules for determining the first set of hyperplanes comprise the choice of hyperplanes passing through the barycentre of the reference vectors.

Such a hyperplane has the property of dividing the space into two parts having the same number of reference vectors. Thus, each reiteration of the step of forming a second set of reference vectors leads to elimination of half the reference vectors. For any input vector, and whatever the order in which the hyperplanes are selected, a given number of reiterations produces a second set of reference vectors having a known number of vectors, amongst which the exhaustive search will be performed.

According to another preferred characteristic of the invention, the first rules for determining the first set of hyperplanes comprise the choice of hyperplanes orthogonal to the base vectors of the space containing the reference vectors.

This characteristic has the advantage of simplifying the calculations for eliminating the reference vectors which are on the other side of the first hyperplane selected, compared with the input vector, since it is sufficient to compare one coordinate of the reference vector with one coordinate of the input vector in order to find out whether or not they are on the same side of the hyperplane.

This characteristic, combined with the preceding characteristic, also simplifies the calculations for eliminating the reference vectors which are on the other side of the first hyperplane selected, compared with the input vector, since it is sufficient to compare the sign of one coordinate of the reference vector with the sign of one coordinate of the input vector in order to find out whether or not they are on the same side of the hyperplane.

Advantageously, the second rules for selecting the first hyperplane consist of selecting the hyperplane for which the distance to the input vector is the greatest.

Thus, the risk of eliminating the reference vector closest to the input vector is minimised.

According to another preferred characteristic of the invention, the third search rules comprise calculation of the distance from the input vector to all the reference vectors in the second set of reference vectors and selection of the reference vector for which the distance is the smallest.

This exhaustive search is performed for a limited number of reference vectors, this number depending on the number of reiterations of the selection and formation steps.

In another aspect, the invention concerns a method for coding a digital signal by vectorial quantification with a dictionary of reference vectors forming a first set of reference vectors stored in a memory means, comprising division of the digital signal into input vectors, characterised in that it includes a prior step of determining, according to first rules, a first set of hyperplanes in the space containing the reference vectors, as described above, then, for each input vector, the steps leading to the search for a close neighbor, as described above.

This method has advantages analogous to those described previously.

Each reference vector is associated with an index. An input vector is coded by the index of the reference vector which is its close neighbor.

In yet another aspect, the invention concerns a method for producing a dictionary of reference vectors from an initial dictionary of reference vectors forming a first set of reference vectors stored in a memory means, and predetermined digital signals stored in a memory means, the said digital signals are divided into input vectors, characterised in that it includes:

a prior step of determining, according to first rules, a first set of hyperplanes in the space containing the reference vectors, as described above, then, for each input vector of the predetermined digital signals, the steps leading to the search for a close neighbor, as described above, then, for each reference vector in the initial dictionary, the steps of:

calculating the barycentre of the input vectors for which the reference vector under consideration is a close neighbor, substituting the said barycentre for the reference vector under consideration in the initial dictionary, so as to form a modified dictionary, the determination, selection, formation, reiteration, search, calculation and substitution steps being reiterated a number of times, taking, at each iteration of the set of these steps, the modified dictionary at the preceding iteration as the initial dictionary and as the first set of reference vectors.

The invention then makes it possible to construct a dictionary of reference vectors very quickly, exploiting all the advantages of the multidimensional close neighbor search according to the present invention, notably its speed.

According to a preferred characteristic, the determination, selection, formation, reiteration, search, calculation and substitution steps are reiterated until the successive modified dictionaries converge to a convergence dictionary.

The invention also concerns a method for coding a digital signal by local vectorial quantification from an initial dictionary of reference vectors forming a first set of reference vectors stored in a memory means, comprising division of the digital signal into input vectors, characterised in that it includes a prior step of determining, according to first rules, a first set of hyperplanes in the space containing the reference vectors, as described above, then, for each input vector of the digital signal, the steps leading to the search for a close neighbor of the input vector in the set of reference vectors as described above, then, for each reference vector in the initial dictionary, the steps of:

calculating the barycentre of the input vectors for which the reference vector under consideration is a close neighbor, substituting the barycentre for the reference vector under consideration in the initial dictionary, so as to form a modified dictionary, the determination, selection, formation, reiteration, search, calculation and substitution steps being reiterated a number of times, taking, at each iteration of the set of these steps, the modified dictionary at the preceding iteration as the initial dictionary and as the first set of reference vectors.

In this aspect, the invention makes it possible to combine the advantages already referred to of the multidimensional close neighbor search according to the invention, and those of local vectorial quantification.

Local vectorial quantification makes it possible to determine, for a given digital signal, an optimum reference vector dictionary. By virtue of the invention, this determination is performed rapidly.

In another aspect, the invention concerns a device for coding a vector by vectorial quantification having a memory means for storing a first set of reference vectors, and a means for entering the vector to be coded, characterised in that it has:
means, adapted to implement first rules, for determining a first set of hyperplanes in the space containing the reference vectors,
means, adapted to implement second rules, for selecting a first hyperplane from the first set of hyperplanes,
means for forming a second set of reference vectors, by eliminating reference vectors which are on the other side of the first hyperplane selected, compared with the input vector,
means for forming a second set of hyperplanes, by eliminating the first hyperplane from the first set of hyperplanes,
the means for forming the second set of reference vectors and the second set of hyperplanes being adapted to reiterate the formation operations a predetermined number of times, taking, at each reiteration, as the first set of reference vectors and the first set of hyperplanes, respectively, the second set of reference vectors and the second set of hyperplanes formed previously,
means, adapted to implement third rules, for searching for the closest neighbor of the input vector in the second set of reference vectors.

This device implements the corresponding method, and has analogous advantages. This device may form part of a digital data processing device, such as a digital camera for example.

Figure 2:
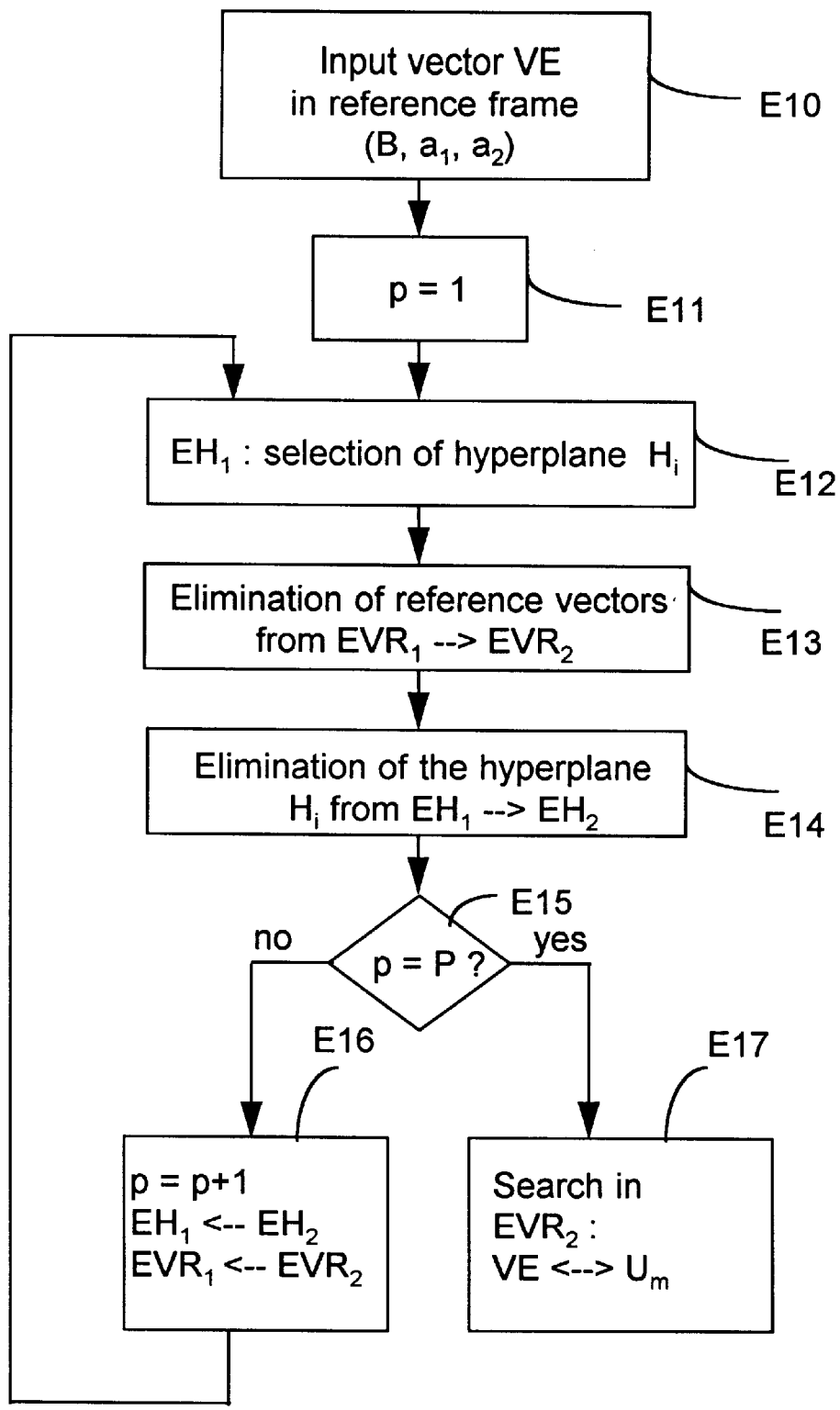
Figure 3:
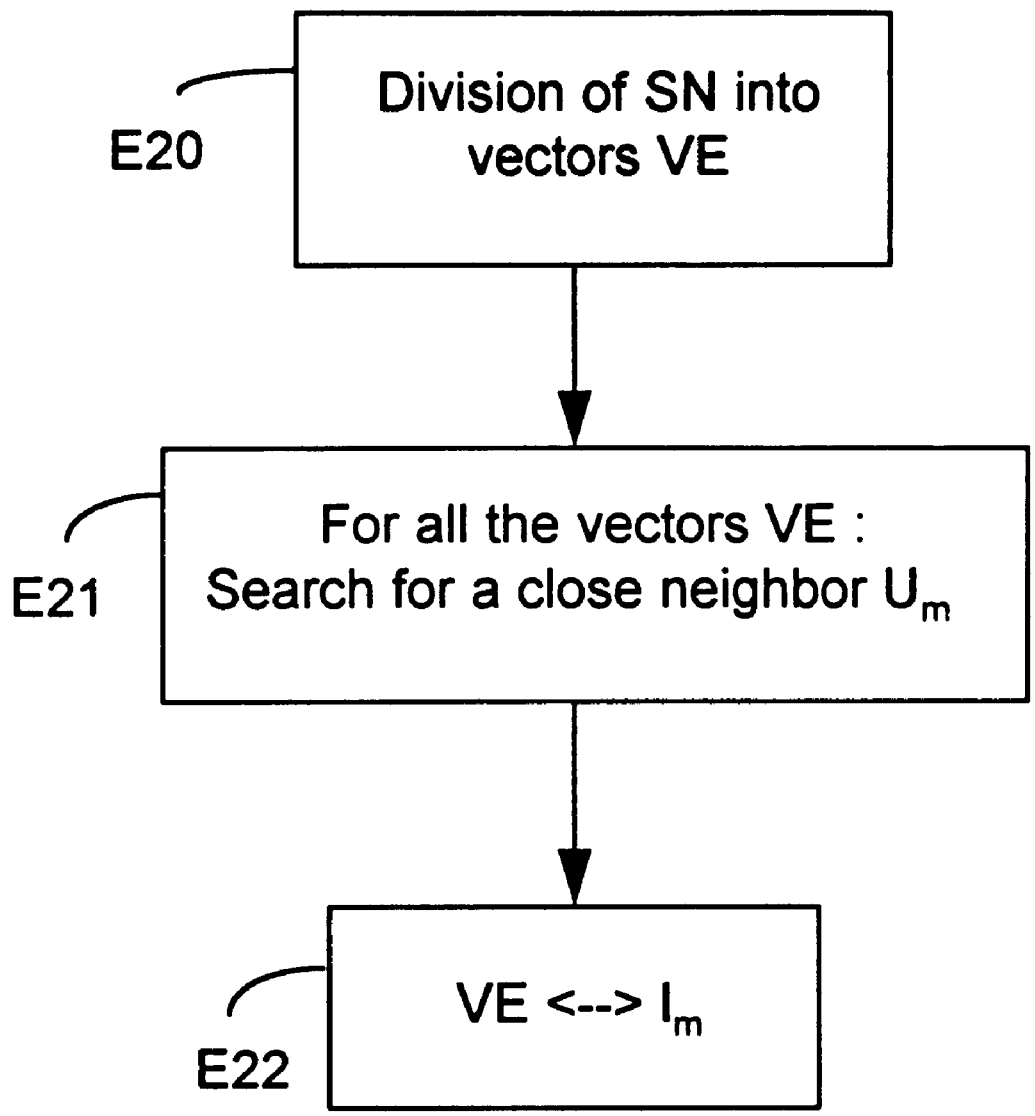
Figure 4:
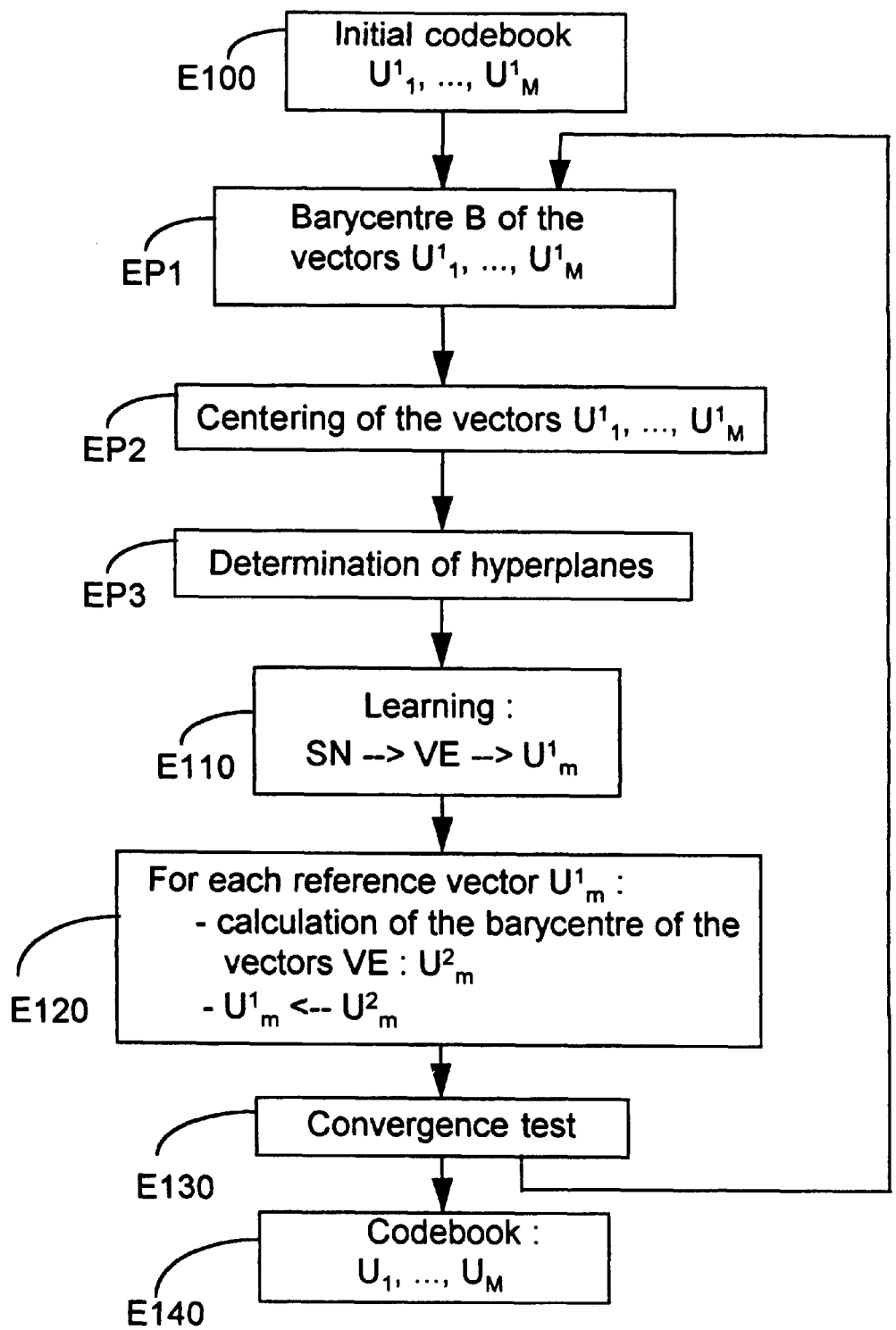
Figure 5:
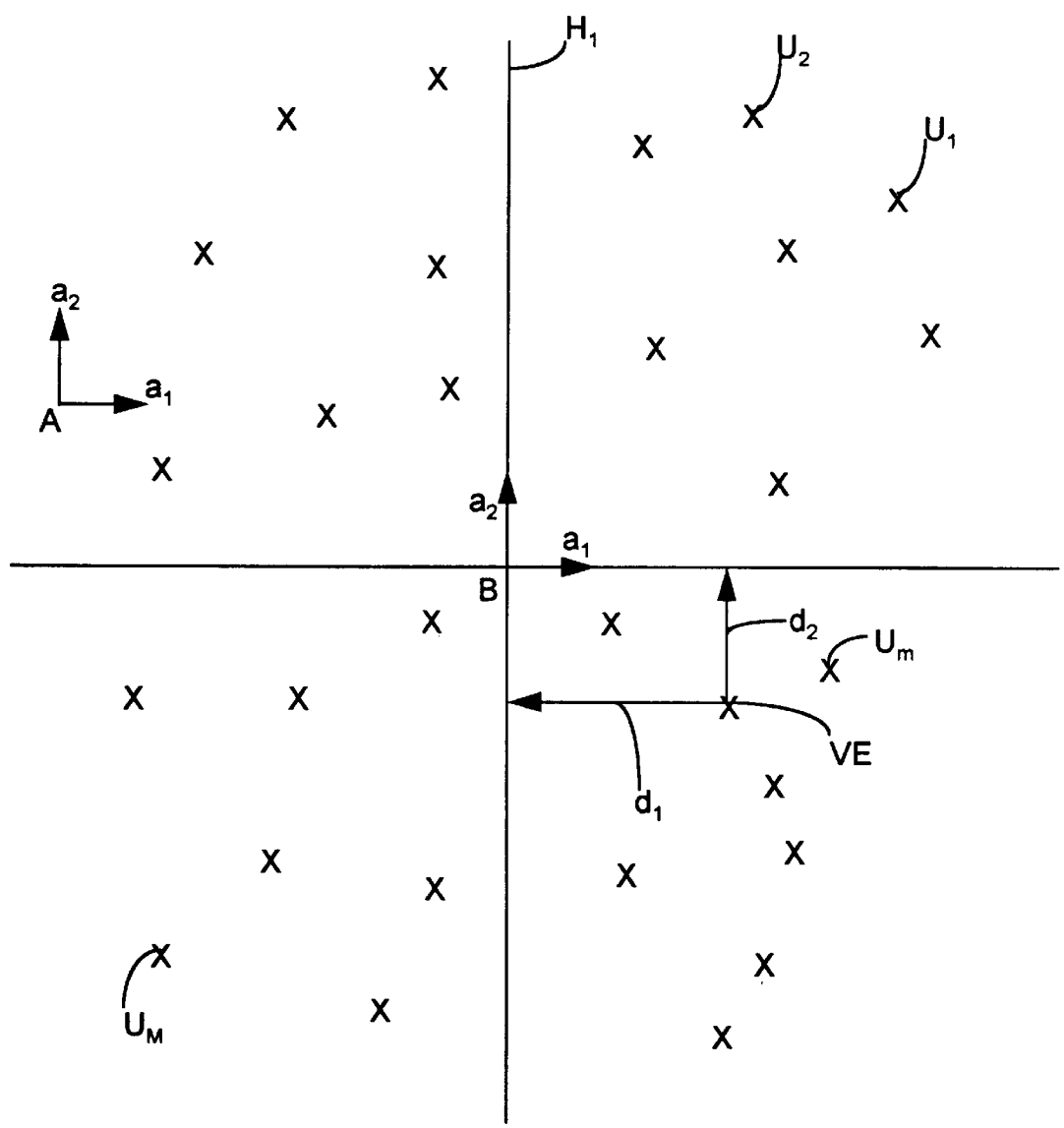
Figure 6:
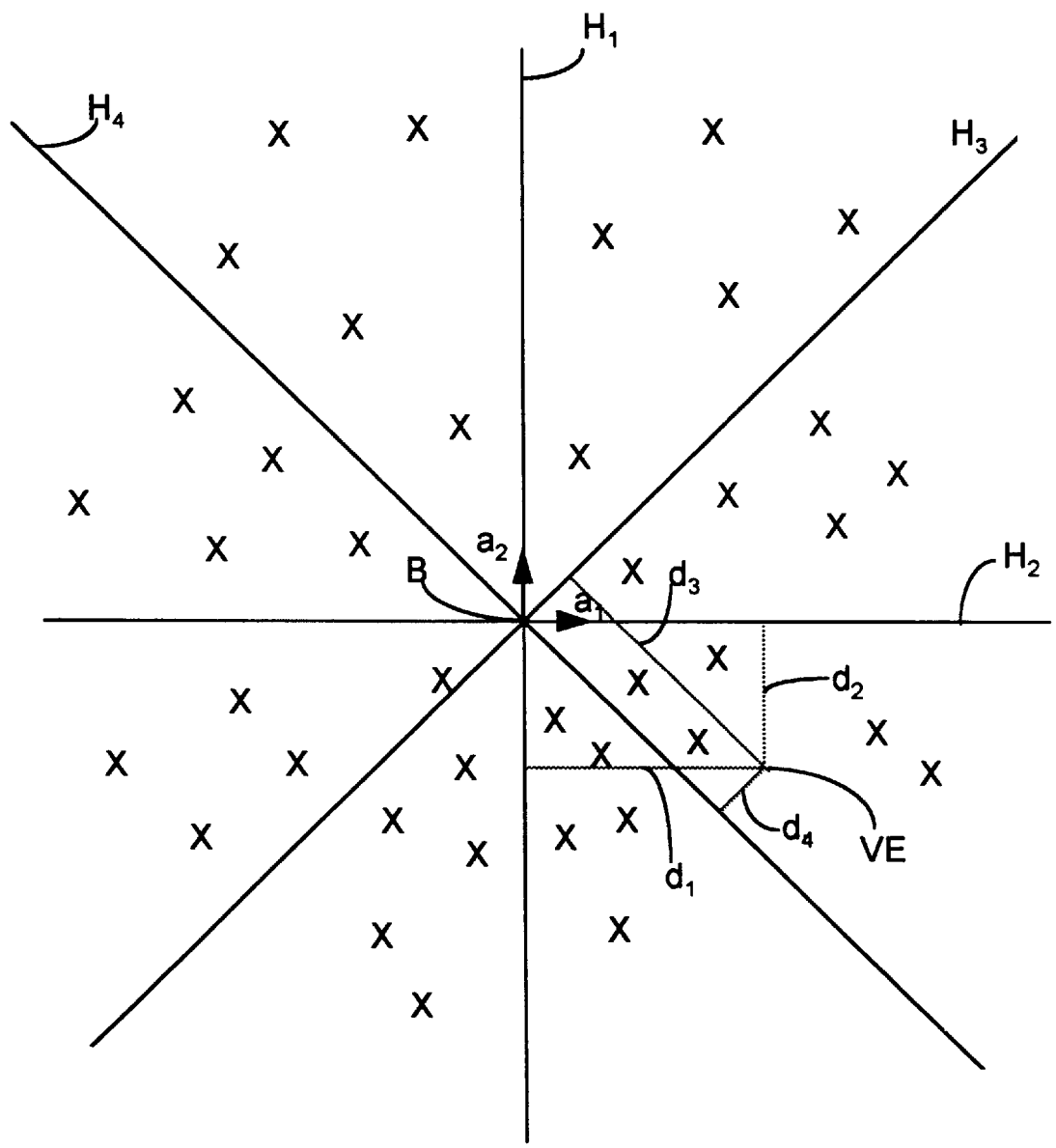
Figure 7:
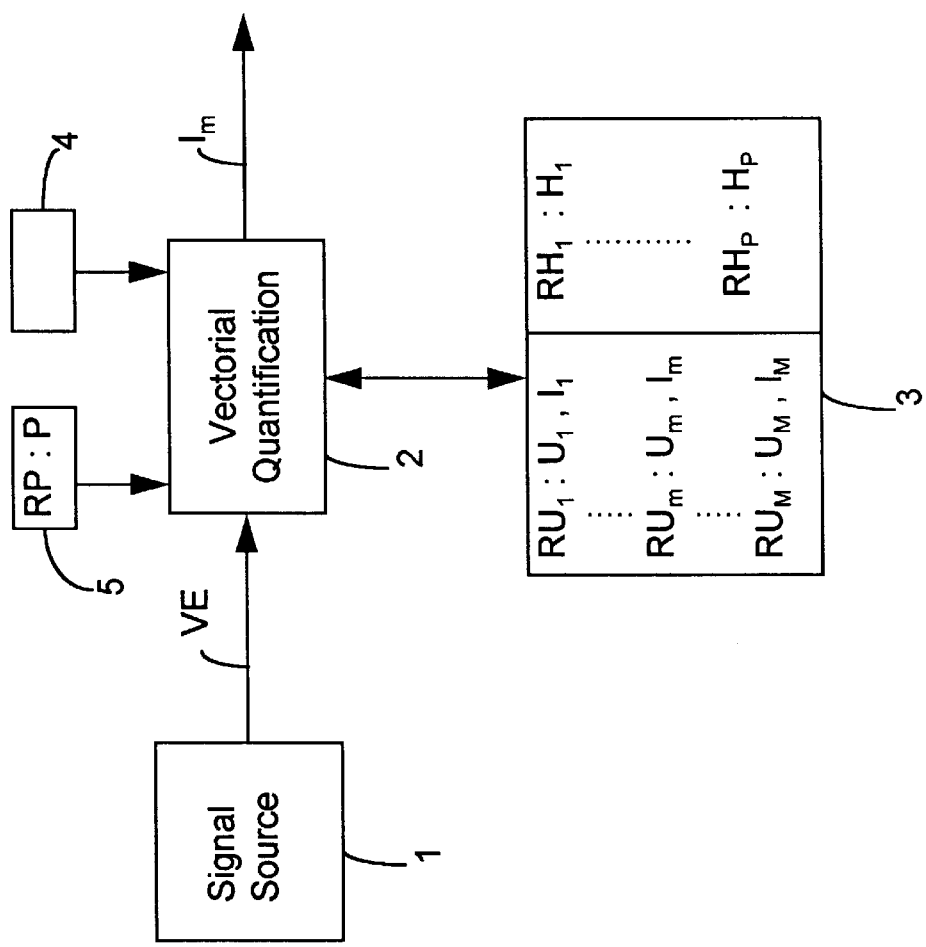
Figure 8:
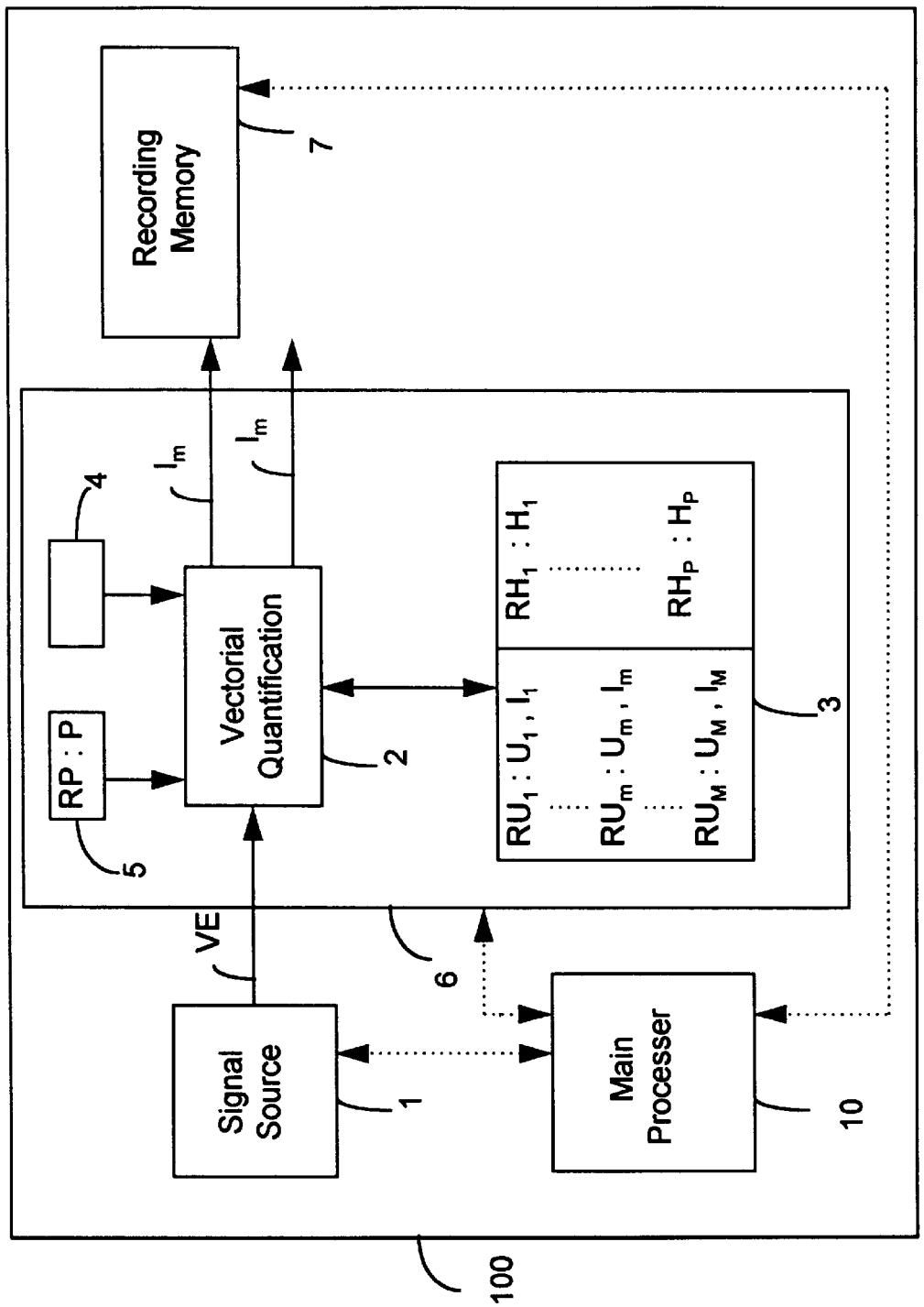

The characteristics and advantages of the present invention will emerge more clearly from a reading of a preferred embodiment illustrated by the accompanying drawings, in which:

FIG. 1 depicts the first part of a multidimensional close neighbor search algorithm, according to the present invention, FIG. 2 depicts the second part of a multidimensional close neighbor search algorithm, according to the present invention, FIG. 3 depicts a vectorial quantification coding algorithm according to the present invention, FIG. 4 depicts an algorithm for producing a dictionary of reference vectors according to the present invention, FIGS. 5 and 6 illustrate the multidimensional close neighbor search in a two-dimensional space, FIG. 7 depicts a vectorial quantification coding device according to the present invention, and FIG. 8 depicts a data compression device making use of the present invention.

In the embodiment chosen and depicted in FIGS. 1 and 2, a multidimensional close neighbor search algorithm according to the invention has two main parts.

This search algorithm may be used for global or local vectorial quantification, or for production of a code vector dictionary usable for vectorial quantification. These different aspects will be developed subsequently.

The first part is depicted in FIG. 1 and has prior steps EP1 to EP3, which are carried out once and for all and the aim of which is to facilitate execution of the second part.

A set $EVR_1$, or dictionary, of M reference vectors $U_1$ to $U_M$ of dimension N is considered. Any vector $U_m$ of the dictionary $EVR_{,1}$, with m between 1 and M, has N coordinates $(U_{m,1}, \ldots, U_{m,N})$ expressed in a predetermined reference frame $(A, a_1, a_2, \ldots, a_N)$ of the N-dimensional space, where A is a point of origin of the space, and $a_1, a_2, \ldots, a_N$ are base vectors of the space.

The step EP1 is determination of the barycentre B of the reference vectors. The barycentre B is a vector of the N-dimensional space, the N coordinates of which $(b_1, \ldots, b_n, \ldots, b_N)$ depend on the coordinates of the vectors $U_1$ to $U_M$ and are determined by the following relationships:

$$b_1 = (U_{1,1} + U_{2,1} + \ldots + U_{M,1})/M$$

$$b_n = (U_{1,n} + U_{2,n} + \ldots + U_{M,n})/M$$

$$b_N = (U_{1,N} + U_{2,N} + \ldots + U_{M,N})/M$$

The next step EP2 is calculation of coordinates of the reference vectors in a reference frame centered on the barycentre B. The reference frame chosen has the barycentre B as its origin and the vectors $(a_1, \ldots, a_N)$ as base vectors. The change of reference frame then corresponds to a translation between the reference frame $(A, a_1, \ldots, a_N)$ and the barycentric reference frame $(B, a_1, \ldots, a_N)$.

For each reference vector, the calculation consists of subtraction of the coordinates of the barycentre B from those of the vector under consideration, that is for the vector $U_m$:

$$V_{m,1} = U_{m,1} - b_1$$

$$V_{m,n} = U_{m,n} - b_n$$

$$V_{m,N} = U_{m,N} - b_N$$

The reference vectors $U_1$ to $U_M$ are thus centered around their barycentre B. The barycentre B of the reference vectors and the base vectors $a_1, a_2, \ldots, a_N$ form a reference frame around which the reference vectors are distributed.

The next step EP3 is determination of a first set $EH_1$ of hyperplanes. This determination is performed according to first rules.

According to a first embodiment, the hyperplanes are chosen from amongst the hyperplanes orthogonal to the base vectors $a_1, a_2, \ldots, a_N$, which simplifies the subsequent calculations.

According to a second embodiment, the hyperplanes are chosen from amongst the hyperplanes passing through the barycentre B of the reference vectors.

According to a third embodiment, the hyperplanes are chosen from amongst the hyperplanes orthogonal to the base vectors and passing through the barycentre of the reference vectors. In this embodiment N hyperplanes $H_1, \ldots H_n, \ldots H_N$ are determined, amongst which any hyperplane $H_n$ is orthogonal to the base vector $a_n$. This embodiment will be considered more particularly subsequently.

In the first and third cases, the number of hyperplanes chosen is at most equal to the dimension N of the space under consideration.

In every case, the hyperplanes selected divide the space into half-space intersections.

In the second and third cases, the hyperplanes selected divide the space into half-space intersections all having a substantially equal number of reference vectors.

According to a fourth embodiment, the hyperplanes are predetermined independently of the reference vectors. The preliminary steps then do not include the steps EP1 and EP2 and are limited to the choice of reference vectors and hyperplanes. The preliminary calculations are then reduced, to the detriment of the calculation time which will then be necessary to search for a close neighbor for each input vector.

Other rules for determining the first set of hyperplanes may be implemented by persons skilled in the art.

The second part of the algorithm for a multidimensional search for a close neighbor of an input vector VE according to the invention is depicted in FIG. 2. This part has steps E10 to E17 which are passed through in order to search for a close neighbor of the input vector VE, amongst the reference vectors $U_1$ to $U_M$.

The input vector VE represents physical data; it is for example a block of adjacent pixels in a digital image. The input vector VE is known by its coordinates ($VE_1$, $VE_2$, ..., $VE_N$) in the reference frame (A, $a_1$, $a_2$, ..., $a_N$). At the step E10, these coordinates are expressed in the centring reference frame (B, $a_1$, $a_2$, ..., $a_N$), by calculations analogous to those of the preliminary step EP2:

$$ve_1 = VE_1 - b_1$$

$$ve_n = VE_n - b_n$$

$$ve_N = VE_N - b_N$$

The step E11 is initialisation of a count parameter p to the value 1.

The step E12 is the selection of a hyperplane $H_i$ from the first set $EH_1$ of hyperplanes, according to second rules. Preferably, selection of the hyperplane $H_i$ comprises calculation of the distance from the input vector VE to each hyperplane. The hyperplane selected is the one for which the calculated distance is the greatest.

In the preferred embodiment, according to which the hyperplanes are orthogonal to the base vectors $a_1$, $a_2$, ..., $a_N$ and pass through the origin B of the barycentric reference frame, calculation of the distances from the input vector to the hyperplanes is instant, since the distance from the input vector to a hyperplane $H_n$ is equal to the absolute value of the coordinate $ve_n$ of the input vector VE. The step E12 is then limited to comparison of the coordinates ($ve_1$, $ve_N$) with one other, and to selection of the vector $H_i$ corresponding to the largest coordinates $ve_i$.

The next step E13 is elimination of reference vectors which are situated on the other side of the selected hyperplane $H_i$ compared with the input vector VE. Where the hyperplanes are orthogonal to the base vectors and pass through the origin of the reference frame, the reference vectors eliminated are those of which the i-th coordinate is not of the same sign as that $ve_i$ of the input vector VE.

This elimination has an error risk, since it is possible that the closest neighbor of the input vector is amongst the reference vectors eliminated. This error risk is minimised by selection of the hyperplane $H_i$ furthest from the input vector VE.

A second reference vector set $EVR_2$ is then considered, which is a sub-set of the preceding set $EVR_1$ and which comprises the reference vectors of the set $EVR_1$ which have not been eliminated.

The step E14 is elimination of the hyperplane $H_i$ from the first set of hyperplanes considered $EH_1$. A second set of hyperplanes $EH_2$ is then considered, which is a sub-set of the first set $EH_1$, comprising the hyperplanes of the first set $EH_1$ with the exception of the hyperplane $H_i$.

The step E15 is a test of the value of the count parameter p. As long as the parameter p is not equal to a predetermined number P, which is the search depth, the steps E12 to E14 are reiterated, taking, as the first set of hyperplanes, the second previously determined set and, as the first set of reference vectors, the second previously determined set.

The number of reference vectors and the number of hyperplanes are thus reduced at each iteration of the steps E12 to E14.

When the parameter p is not equal to the number P, the step E15 followed by the step E16, which is the incrementing of the parameter p by one unit, and substitution of the second hyperplane set $EH_2$ for the first hyperplane set $EH_1$, and substitution of the second set of reference vectors $EVR_2$ for the first set of reference vectors $EVR_1$.

When the parameter p is equal to the number P, the step E15 followed by the step E17, which is the exhaustive search for the closest neighbor of the input vector VE amongst the reference vectors of the last set of reference vectors $EVR_2$ determined at the last iteration of the step E13.

This search is performed according to third rules comprising calculation of the distances of the input vector VE with each reference vector of the last set of reference vectors, then comparison of the calculated distances. The closest neighbor of the input vector in the last reference vector set is the reference vector $U_m$ for which the calculated distance is the smallest.

The closest neighbor of the input vector in the last reference vector set is a close neighbor of the input vector in the initial set of all reference vectors. This is because it is possible that a closer reference vector was eliminated during an iteration of the steps E12 to E14.

The search depth P makes it possible to adjust the compromise between speed and error risk. The greater the depth P, the greater the number of reference vectors eliminated; at the step E16, the remaining number of reference vectors on which the closest neighbor exhaustive search is performed is thus more reduced. The exhaustive search of the step E16 is thus more rapid. Correlatively, the risk of having eliminated the closest neighbor of the input vector is greater, since more reference vectors have been eliminated.

In another aspect of the invention depicted in FIG. 3, a method for vectorial quantification of a digital signal has the prior steps EP1 to EP3, and steps E20 to E22. Global vectorial quantification is concerned here, that is to say a digital signal is coded from a predetermined reference vector dictionary.

In the particular context of vectorial quantification, each reference vector $U_m$ is associated with a respective index Im.

A digital signal SN, for example representing a digital image, is divided into input vectors VE at the step E20.

The next step E21 consists of searching, for all the input vectors VE, for a respective close neighbor $U_m$.

Thus, for each input vector VE, the step E21 includes the steps E10 to E17 described previously.

The step E22 next consists of assigning, to each input vector VE, the index $I_m$ corresponding to the respective close neighbor $U_m$. The index $I_m$ is a compressed form of the input vector VE, which can then be stored or transmitted to a receiver.

Another aspect of the invention is depicted in FIG. 4 and concerns a method for producing a code vector dictionary usable for vectorial quantification. This method comprises the prior steps EP1 to EP3 described previously and the steps E100 to E140.

An initial code vector dictionary is a set of M reference vectors $U^1_1$ to $U^1_M$ considered at the step E100.

The prior steps EP1 to EP3 are carried out next, on the basis of the initial dictionary.

The next learning step E110 consists of coding a set of predetermined digital signals SN, for example digital images, according to coding by vectorial quantification with the initial dictionary. The learning step comprises, for each digital image, the steps E20 to E22 described previously (FIG. 3).

Thus, each digital image is divided into vectors forming input vectors VE which are coded in accordance with the steps E10 to E17 described previously. Each input vector VE is coded by its close neighbor $U^1_m$ determined at the step E17.

The result of the step E110 is relationships of correspondence between each input vector VE and the reference vectors $U^1_1$ to $U^1_M$.

At the next step E120, each reference vector $U^1_m$ is replaced in the reference vector dictionary by the barycentre $U^2_m$ of the input vectors VE of which it is a close neighbor, as determined at the preceding step E110. The result of the step E120 is a modified dictionary of reference vectors $U^2_1$ to $U^2_M$.

The steps EP1, EP2, EP3, E10 and E120 are repeated a number of imes taking, at each iteration, the previously modified reference vector dictionary as the initial dictionary.

The number of iterations of the steps EP1, EP2, EP3, E110 and E120 depends on a convergence test performed at the step E130. This test consists of measuring the difference between the reference vectors $U^1_1$ to $U^1_M$ used at the step E110 and the reference vectors U21 to U2 determined at the step E120. This test is for example based on mean quadratic error measurements, which are then compared with a threshold. The method has converged when the calculated differences are below the threshold.

The reference vector dictionary determined last after convergence of the method is, at the step E140, the dictionary of reference vectors $U_1$, á $U_M$ which will next be used for vectorial quantification.

In another aspect of the invention, the method depicted in FIG. 4 may be used to determine a local reference vector dictionary.

A local reference vector dictionary is obtained for a digital signal, for example an image, by using that image as a learning image. The dictionary obtained is then optimum, since it is the dictionary most adapted to the image in question.

The steps E100 to E140 are performed for a given digital signal SN, and result in an optimum reference vector dictionary for the digital signal SN in question.

By virtue of the invention, the local dictionary is obtained very quickly for a given image. The local dictionary is then used to code the image by vectorial quantification. This coding is performed as described in FIG. 3. The coded image may then be stored or transmitted accompanied by its local dictionary.

In order to illustrate an application of the algorithm of FIGS. 1 and 2, a two-dimensional space, in which a first set of reference vectors comprises the reference vectors $U_1$ to $U_M$, with M an integer, is considered in FIG. 5. The reference vectors are distributed in the two-dimensional space, and can be represented by points of which the coordinates $(U_{1,1}, U_{1,2})$ to $(U_{M,1}, U_{M,2})$ are expressed in a reference frame $(A, a_1, a_2)$ of the space.

In accordance with the step EP1, the barycentre B of the reference vectors is determined by its coordinates $(b_1, b_2)$ in the reference frame $(A, a_1, a_2)$:

$$b_1 = (U_{1,1} + U_{2,1} + \ldots + U_{M,1})/M$$

$$b_2 = (U_{1,2} + U_{2,2} + \ldots + U_{M,2})/M$$

The reference vectors are centered around the barycentre B. The reference frame $(B, a_1, a_2)$ is considered, in which a reference vector $U_m$, with m any number between 1 and M, has coordinates:

$$V_{m,1} = U_{m,1} - b_1,$$

$$V_{m,2} = U_{m,2} - b_2.$$

Centering of the reference vectors (step EP2) is thus carried out.

Hyperplanes $H_1$ and $H_2$, which are straight lines in the case of a two-dimensional space, are considered. Hyperplanes orthogonal to the vectors $a_1$ and $a_2$ of the barycentric reference frame, and more particularly those passing through the barycentre B (step EP3), are chosen.

The hyperplanes $H_1$ and $H_2$ each divide the space into two parts containing the same number of reference vectors.

An input vector VE has coordinates $(VE_1, VE_2)$ in the reference frame $(A, a_1, a_2)$ and coordinates $(ve_1, ve_2)$ in the reference frame $(B, a_1, a_2)$.

$$ve_1 = VE_1 - b_1,$$

$$ve_2 = VE_2 - b_2.$$

The distances $d_1$ and $d_2$ of the input vector VE in relation to each of the hyperplanes $H_1$ and $H_2$ are determined. Because of the choice of hyperplanes, the distances $d_1$ and $d_2$ are respectively equal to the coordinates $ve_1$ and $ve_2$ of the input vector VE.

It is assumed that the distance $d_1$ is greater than the distance $d_2$; the hyperplane $H_1$ is selected. The reference vectors which are on the other side of the hyperplane $H_1$ compared with the input vector VE are eliminated.

If the search depth is equal to one, the closest neighbor of the input vector VE is sought amongst the vectors which are on the same side of the hyperplane $H_1$ as the input vector VE. As described above, this search is performed by calculating the distances of the input vector with each of the reference vectors, then comparing the calculated distances. The closest neighbor of the input vector is the reference vector $U_m$ for which the calculated distance is the smallest.

If the search depth is equal to two, the hyperplane $H_2$ is considered. In this particular case where the search depth is equal to the number of hyperplanes, the last iteration is simplified since there remains only a single hyperplane to be taken into account.

The reference vectors which are on the other side of the hyperplane $H_2$ compared with the input vector VE are eliminated.

The closest neighbor of the input vector VE is sought amongst the vectors which are both on the same side of the hyperplane $H_1$ as the input vector VE and on the same side of the hyperplane $H_2$ as the input vector VE. As previously, this search is performed by calculating the distances of the input vector with each of the reference vectors, then comparing the calculated distances. The closest neighbor of the input vector is the reference vector $U_m$ for which the calculated distance is the smallest.

With reference to FIG. 6, the same set of reference vectors $U_1$ to $U_M$, in a two-dimensional space, is considered.

Four hyperplanes $H_1$ to $H_4$ all passing through the barycentre B of the reference vectors are now considered.

The hyperplanes $H_1$ and $H_2$ are those described previously; they divide the space into four areas all having the same number of reference vectors.

The hyperplanes $H_3$ and $H_4$ are chosen in order to divide each of the preceding areas into areas all having the same number of reference vectors. In the particular case of the two-dimensional space, the hyperplanes $H_3$ and $H_4$ are the straight lines oriented at 45 degrees with respect to the straight lines $H_1$ and $H_2$.

The search depth here may be equal to 1, 2, 3 or 4. It should be noted that calculation of the distance from the input vector VE to the hyperplanes $H_3$ and $H_4$ is more complicated than for the other two hyperplanes $H_1$ and $H_2$.

FIG. 7 depicts a vectorial quantification coding device according to the present invention.

A signal source 1 is connected to a vectorial quantification circuit 2. The signal source supplies input vectors VE to the circuit 2. The input vectors are for example blocks of adjacent pixels of an image. The signal source then has a memory for storing images and a circuit for dividing into vectors.

The vectorial quantification circuit 2 is connected to a random access memory 3 containing registers $RU_1$ to $RU_M$ in which the reference vectors, or code vectors, $U_1$ to $U_M$ are stored. The memory 3 also contains registers $RH_1$ to $RH_p$ for storing the hyperplanes $H_1$ to $H_p$ where P is an integer.

A read-only memory 4 contains the algorithm described previously and a random access memory 5 contains a register RP in which the search depth P is stored. The memories 4 and 5 are connected to the vectorial quantification circuit 2.

The vectorial quantification circuit 2 has an output which may be connected to a transmission circuit, or to a memory.

The device may be implemented by means of a microprocessor associated with random access and read-only memories.

The signal source delivers an input vector VE to the vectorial quantification circuit 2.

The vectorial quantification circuit codes the input vector VE by searching for a close neighbor of the input vector amongst the reference vectors $U_1$ to $U_M$. This search is performed as described above and leads to determination of a close neighbor $U_m$ of the input vector VE. The vectorial quantification circuit delivers as an output the index $I_m$ associated with the reference vector $U_m$.

FIG. 8 depicts a data compression device integrated into a digital data processing device, which here is a digital camera 100. Only the components specific to implementation of the invention are depicted and the elements analogous to those of FIG. 7 have the same numeric reference.

A digital compression device 6 integrates the vectorial quantification circuit 2 and the memories 3, 4 and 5 as described previously (FIG. 7).

The signal source 1 supplies a digital signal representing a digital image, in the form of input vectors VE, to the digital compression device 6.

As previously, the vectorial quantification circuit 2 codes the input vector VE by searching for a close neighbor of the input vector amongst the reference vectors $U_1$ to $U_M$. This search is performed as described above and leads to determination of a close neighbor $U_m$ of the input vector VE. The vectorial quantification circuit delivers as an output the index $I_m$ associated with the reference vector $U_m$. The set of indices corresponding to the input vectors of an image forms a compressed image.

The vectorial quantification circuit 2 has two outputs, one of which is connected to a recording memory 7 for storing the compressed digital images. The other output of the circuit 2 is intended to be connected to an external device, such as a transmission circuit, or external memory, for example.

A main processor 10 of the camera controls the signal source 1, the compression device 6 and the memory 7.

Naturally the present invention is in no way limited to the embodiments described and depicted, but on the contrary encompasses any variant within the capability of persons skilled in the art.

What is claimed is:

1. A method for a multidimensional search for a close neighbor of an input vector representing physical data, amongst a first set of reference vectors stored in memory means, said method comprising the steps of:

determining, according to first rules, a first set of hyperplanes in a space containing the reference vectors;

selecting, according to second rules, a first hyperplane from the first set of hyperplanes;

forming a second set of reference vectors from the first set of reference vectors, by eliminating the reference vectors which are on the other side of the first hyperplane selected, compared with the input vector;

forming a second set of hyperplanes, by eliminating the first hyperplane from the first set of hyperplanes;

reiterating, a predetermined number of times, the selection step and the two formation steps, taking in each iteration, as the first set of reference vectors and the first set of hyperplanes, respectively, the second set of reference vectors and the second set of hyperplanes formed in the last proceeding iteration;

searching, according to third rules, for the closest neighbor of the input vector, in the second set of reference vectors.

2. A method for coding a digital signal by vectorial quantification with a dictionary of reference vectors forming a first set of reference vectors stored in memory means, comprising division of the digital signal into input vectors, said method comprising the steps of:

determining, according to first rules, a first set of hyperplanes in a space containing the reference vectors; and then, for each input vector:

selecting, according to second rules, a first hyperplane from the first set of hyperplanes, forming a second set of reference vectors from the first set of reference vectors, by eliminating reference vectors which are on the other side of the first hyperplane selected, compared with the input vector, forming a second set of hyperplanes, by eliminating the first hyperplane from the first set of hyperplanes, reiterating, a predetermined number of times, the selection step and the two formation steps, taking in each iteration, as the first set of reference vectors and the first set of hyperplanes, respectively, the second set of reference vectors and the second set of hyperplanes formed in the last proceeding iteration, and searching, according to third rules, for the closest neighbor of the input vector in the second set of reference vectors.

3. A method for producing a dictionary of reference vectors from an initial dictionary of reference vectors forming a first set of reference vectors stored in memory means, and predetermined digital signals stored in memory means, the digital signals being divided into input vectors, said method comprising the steps of:

determining, according to first rules, a first set of hyperplanes in the space containing the reference vectors;

for each input vector of the predetermined digital signals:

selecting, according to second rules, a first hyperplane from the first set of hyperplanes, forming a second set of reference vectors from the first set of reference vectors, by eliminating the reference vectors which are on the other side of the first hyperplane selected, compared with the input vector, searching, according to third rules, for the closest neighbor of the input vector in the second set of reference vectors; and then, for each reference vector in the initial dictionary:

calculating a barycenter of the input vectors for which the reference vector under consideration is a close neighbor, and substituting the barycenter for the reference vector under consideration in the initial dictionary, so as to form a modified dictionary, wherein the determination, selection, formation, reiteration, search, calculation and substitution steps being reiterated a number of times, taking, at each iteration of the set of these steps, the modified dictionary at the preceding iteration as the initial dictionary and as the first set of reference vectors.

4. A method for coding a digital signal by local vectorial quantification from an initial dictionary of reference vectors forming a first set of reference vectors stored in memory means, including division of the digital signal into input vectors, said method comprising the steps of:

determining, according to first rules, a first set of hyperplanes in the space containing the reference vectors;

then, for each input vector of the digital signal:

selecting, according to second rules, a first hyperplane from the first set of hyperplanes, forming a second set of reference vectors from the first set of reference vectors, by eliminating reference vectors which are on the other side of the first hyperplane selected, compared with the input vector, forming a second set of hyperplanes, by eliminating the first hyperplane from the first set of hyperplanes, reiterating, a predetermined number of times, the selection step and the two formation steps, taking in each iteration, as the first set of reference vectors and the first set of hyperplanes, respectively, the second set of reference vectors and the second set of hyperplanes formed in the last proceeding iteration, and searching, according to third rules, for the closest neighbor of the input vector in the second set of reference vectors; and then, for each reference vector in the initial dictionary:

calculating a barycenter of the input vectors for which the reference vector under consideration is a close neighbor, and substituting the barycenter for the reference vector under consideration in the initial dictionary, so as to form a modified dictionary, wherein the determination, selection formation, reiteration, search, calculation and substitution steps being reiterated a number of times, taking, at each iteration of the set of these steps, the modified dictionary at the preceding iteration as the initial dictionary and as the first set of reference vectors.

5. A method according to any one of claims 1 to 4, further comprising the steps of determining a barycenter of the reference vectors and calculating coordinates of the reference vectors the input vector in a reference frame centered on the barycenter.

6. A method according to claim 5, wherein the first rules for determining the first set of hyperplanes comprise a choice of hyperplanes passing through the barycenter of the reference vectors.

7. A method according to any one of claims 1 to 4, wherein the first rules for determining the first set of hyperplanes comprise a choice of hyperplanes orthogonal to the base vectors of the space containing the reference vectors.

8. A method according to any one of claims 1 to 4, wherein the second rules for selecting the first hyperplane selected comprise selection of the hyperplane for which the distance to the input vector is the greatest.

9. A method according to any one of claims 1 to 4, wherein the third search rules comprise calculation of the distance from the input vector to all the reference in the second set of reference vectors and selection of the reference vector for which the distance is the smallest.

10. A method for producing a dictionary of reference vectors according to claim 3 or 4, wherein the determination, selection, formation, reiteration, search, calculation and substitution steps are reiterated until the successive modified dictionaries converge to a convergence dictionary.

11. An apparatus for coding a vector by vectorial quantification having memory means for storing a first set of reference vectors, and means for entering the vector to be coded, comprising:

means, adapted to implement first rules, for determining a first set of hyperplanes in the space containing the reference vectors;

means, adapted to implement second rules, for selecting a first hyperplane from the first set of hyperplanes;

means for forming a second set of reference vectors, by eliminating reference vectors which are on the other side of the first hyperplane selected, compared with the input vector;

means for forming a second set of hyperplanes, by eliminating the first hyperplane from the first set of hyperplanes, wherein said means for forming the second set of reference vectors and the second set of hyperplanes being adapted to reiterate the formation operations a predetermined number of times, taking, at each reiteration, as the first set of reference vectors and the first set of hyperplanes, respectively, the second set of reference vectors and the second set of hyperplanes formed previously; and means, adapted to implement third rules, for searching for the closest neighbor of the input vector in the second set of reference vectors.

12. An apparatus according to claim 11, further comprising means adapted to determine barycenter of the reference vectors and to calculate coordinates of the reference vectors and the input vector in a reference frame centered on the barycenter.

13. An apparatus according to claim 12, further comprising means adapted to determine the first set of hyperplanes so that it comprises hyperplanes passing through the barycenter of the reference vectors.

14. An apparatus according to any one of claims 11 to 13, wherein said determination means is adapted to implement first rules according to which the first set of hyperplanes comprises hyperplanes orthogonal to base vectors of the space containing the reference vectors.

15. An apparatus according to any one of claims 11 to 13, wherein said selection means is adapted to implement second rules according to which the first hyperplane is the hyperplane for which the distance to the input vector is the greatest.

16. An apparatus according to any one of claims 11 to 13, wherein said search means is adapted to implement third rules consisting of calculating the distance from the input vector to all the reference vectors in the second set of reference vectors and selecting the reference vector for which the distance is the smallest.

17. An apparatus according to any one of claims 11 to 13, wherein said determination, selection, formation and search means are incorporated in:

a microprocessor, a read-only memory having a program for coding a digital signal by vectorial quantification, and a random access memory having registers adapted to record variables modified during execution of the program.

18. A digital data processing device having a coding apparatus according to any one of claims 11 to 13.

* * * * *

UNITED STATES PATENT AND TRADEMARK OFFICE
CERTIFICATE OF CORRECTION

PATENT NO.    : 5,911,011

DATED         : June 8, 1999

INVENTOR(S)   : FÉLIX HENRY

It is certified that error appears in the above-identified patent and that said Letters Patent is hereby corrected as shown below:

COLUMN 1

Line 67, "Vorono" should read --Vorono- --.

COLUMN 2

Line 1, "i" should read --ï--;
    Line 2, "Voronoi" should read --Voronoï--;
    Line 6, "Voronoi" should read --Voronoï--;
    Line 14, "Voronoi" should read --Voronoï--; and "Vorono" should read --Vorono- --;
    Line 15, "i" should read --ï--;
    Line 16, "Voronoi" should read --Voronoï--;
    Line 19, "Voronoi" should read --Voronoï--;
    Line 22, "Voronoi" should read --Voronoï--;
    Line 24, "Voronoi" should read --Voronoï--;
    Line 29, "Voronoi" should read --Voronoï--; and
    Line 57, "previously," should read --previously, and--.

COLUMN 3

Line 50, "minimised" should read --minimized--.

UNITED STATES PATENT AND TRADEMARK OFFICE
CERTIFICATE OF CORRECTION

PATENT NO.    : 5,911,011
DATED         : June 8, 1999
INVENTOR(S)   : FÉLIX HENRY It is certified that error appears in the above-identified patent and that said Letters Patent is hereby corrected as shown below:

COLUMN 4

Line 12, "the said" should read --the--;
    Line 20, "above," should read --above, and--;
    Line 25, "neighbor," should read --neighbor, and--;
    Line 26, "the said" should read --the--;
    Line 28, "dictionary," should read --dictionary, wherein--;
    Line 55, "above," should read --above, and--;
    Line 61, "neighbor," should read --neighbor, and--; and
    Line 64, "dictionary," should read --dictionary, wherein--.

COLUMN 5

Line 35, "previously," should read --previously, and--.

COLUMN 6

Line 8, "$EVR,_1,$" should read --$EVR_1,$--.

COLUMN 7

Line 45, "other," should read --another,--.

UNITED STATES PATENT AND TRADEMARK OFFICE
CERTIFICATE OF CORRECTION

PATENT NO. : 5,911,011
DATED : June 8, 1999
INVENTOR(S) : FÉLIX HENRY

Page 3 of 3

It is certified that error appears in the above-identified patent and that said Letters Patent is hereby corrected as shown below:

COLUMN 8

Line 1, "E15" should read E15--;
Line 50, "Im" should read --$I_m$--; and
Line 56, "E10" should read --E10--.

COLUMN 9

Line 25, "imes" should read --times--;
Line 31, "U21 to U2" should read --$U^2_1$ to $U^2_M$--; and
Line 38, "$U_1$,á" should read --$U_1$ á--.

COLUMN 13

Line 62, "the" should read --and the--.

Signed and Sealed this

Twenty-second Day of May, 2001

Attest:

NICHOLAS P. GODICI

Attesting Officer     Acting Director of the United States Patent and Trademark Office